(12) United States Patent
Zaidi et al.

(10) Patent No.: US 8,759,247 B2
(45) Date of Patent: Jun. 24, 2014

(54) METHANOL ELECTRO-OXIDATION CATALYST AND METHOD OF MAKING THE SAME

(75) Inventors: Syed Mohammed Javaid Zaidi, Dhahran (SA); Saleem Ur Rahman, Dhahran (SA); Shakeel Ahmed, Dhahran (SA); Mukhtar Bello, Zaria (NG)

(73) Assignee: King Fahd University of Petroleum and Minerals, Dhahran (SA)

( * ) Notice: Subject to any disclaimer, the term of this patent is extended or adjusted under 35 U.S.C. 154(b) by 287 days.

(21) Appl. No.: 13/338,163

(22) Filed: Dec. 27, 2011

(65) Prior Publication Data

US 2013/0165318 A1    Jun. 27, 2013

(51) Int. Cl.
| | | |
|---|---|---|
| B01J 23/00 | (2006.01) |
| B01J 23/10 | (2006.01) |
| B01J 23/40 | (2006.01) |
| B01J 23/42 | (2006.01) |
| B01J 23/44 | (2006.01) |
| B01J 23/74 | (2006.01) |

(52) U.S. Cl.
USPC ........... 502/185; 502/182; 502/302; 502/303; 502/304; 502/339; 977/773; 977/775; 977/783

(58) Field of Classification Search
USPC .......... 502/182, 185, 302–304, 339; 977/773, 977/775, 783
See application file for complete search history.

(56) References Cited

U.S. PATENT DOCUMENTS

| | | | |
|---|---|---|---|
| 6,228,803 B1 * | 5/2001 | Gadkaree et al. | 502/416 |
| 7,169,731 B2 | 1/2007 | Chondroudis et al. | |
| 7,220,697 B2 * | 5/2007 | Pak et al. | 502/185 |
| 7,402,544 B2 * | 7/2008 | Pak et al. | 502/60 |
| 7,488,699 B2 | 2/2009 | Huang et al. | |
| 7,507,687 B2 | 3/2009 | Kodas et al. | |
| 7,670,988 B2 * | 3/2010 | Switzer et al. | 502/339 |

(Continued)

FOREIGN PATENT DOCUMENTS

| | | |
|---|---|---|
| GB | 1 501 102 | 2/1978 |
| JP | 60-196511 | 10/1985 |
| JP | 2000-246106 | 9/2000 |

OTHER PUBLICATIONS

"Textural property tuning of ordered mesoporous carbon obtained by glycerol conversion using SBA-15 silica as template," M. Ignat et al. Carbon 48 (2010), pp. 1609-1618.*

(Continued)

Primary Examiner — Patricia L Hailey
(74) Attorney, Agent, or Firm — Richard C Litman (57) ABSTRACT

The methanol electro-oxidation catalysts include nano-oxides of rare earth metals (i.e., cesium, praseodymium, neodymium and samarium) and platinum nano-particles. The nano-oxides of the rare earth metals are dispersed during synthesis of a support material, preferably formed from mesoporous carbon. The platinum nano-particles form between about 10 wt % and about 15 wt % of the methanol electro-oxidation catalyst, the rare earth metal forms between about 10 wt % and about 15 wt % of the methanol electro-oxidation catalyst, and carbon and oxygen forming the balance (between about 70 wt % and about 80 wt %) of the methanol electro-oxidation catalyst.

12 Claims, 7 Drawing Sheets

(56) References Cited

U.S. PATENT DOCUMENTS

| | | | |
|---|---|---|---|
| 7,879,501 | B2 | 2/2011 | Schaevitz et al. |
| 8,114,372 | B2 * | 2/2012 | Pak et al. ............... 423/414 |
| 2002/0136686 | A1 | 9/2002 | Takahashi |
| 2009/0042089 | A1 * | 2/2009 | Choi et al. ............... 429/40 |
| 2011/0091787 | A1 | 4/2011 | McGrath et al. |
| 2011/0281027 | A1 * | 11/2011 | Vogt ............... 427/226 |
| 2012/0196745 | A1 * | 8/2012 | Pak et al. ............... 502/439 |

OTHER PUBLICATIONS

"Preparation and electrocatalytic application of high dispersed Pt nanoparticles/ordered mesoporous carbon composites," Yufan Zhang et al. Electrochimica Acta 56 (2011), pp. 5849-5854.*

"The effect of the use of lanthanum-doped mesoporous SBA-15 on the performance of Pt/SBA-15 and Pd/SBA-15 catalysts for total oxidation of toluene," K. Bendahou et al. Applied Catalysis A: General 351 (2008), pp. 82-87.*

Yuying Yang, Ziyu Zhang and Zhongal H, "Activity improvement of Pt/C catalysts by adding CeO2 nanoparticles", *Journal of Rare Earths*, vol. 29, Issue 1, Jan. 2011, p. 58-63.

Jianshe Wang, Jingyu Xi, Yuxia Bai, Yi Shen, Jie Sun, Liquan Chen, Wentao Zhu, and Xinping Qiu, "Structural designing of Pt-CeO2/CNTs for methanol electro-oxidation", *Journal of Power Sources*, vol. 164, Issue 2, Feb. 10, 2007, p. 555-560.

Jung-Byun Nam et al., "Direct methanol fuel cell Pt-carbon catalysts by using SBA-15 nanoporous templates", Electrochemistry Communications 6 {2004), pp. 737-741.

* cited by examiner

METHANOL ELECTRO-OXIDATION CATALYST AND METHOD OF MAKING THE SAME

BACKGROUND OF THE INVENTION

1. Field of the Invention

The present invention relates to electro-oxidation catalysts, and particularly to methanol electro-oxidation catalysts including rare earth metal oxides and mesoporous carbon, and a method of making the same.

2. Description of the Related Art

The electro-catalysis of methanol oxidation is among the most significant challenges limiting large-scale commercialization of direct methanol fuel cells. In the anode of the direct methanol fuel cell, methanol is directly supplied as a fuel. During methanol electro-oxidation, methanol is oxidized to produce carbon dioxide, electrons, and protons:

$$Pt+CH_3OH_{sol} \rightarrow Pt-CO_{ads}+4H^++4e^- \quad (1)$$

$$Pt+H_2O \rightarrow Pt-OH_{ads}+H^++e^- \quad (2)$$

$$Pt-CO_{ads}+Pt-OH_{ads} \rightarrow 2Pt+CO_2+H^++e^- \quad (3)$$

Among all of the metals, platinum (Pt) is believed to be the most active for the electro-oxidation of methanol in an acid environment. In general, for both the cathode catalyst and the anode catalyst, Pt or an alloy containing Pt as a main constituent element is used. However, Pt is very expensive, and during the methanol electro-oxidation reaction, intermediate carbon monoxide is produced, which is strongly adsorbed on the Pt surface. The adsorption of carbon monoxide as an intermediate material in the reaction on the surface of the Pt catalyst deteriorates its catalytic activity, which negatively affects the performance of the direct methanol fuel cell. Thus, in order to realize the success of direct methanol fuel cell technology, new methanol electro-oxidation catalysts having lower percentages of platinum would be desirable.

A number of binary and ternary catalysts for methanol electro-oxidation are known. Most of these catalysts are based on modification of Pt with some other metal(s). Among the various catalyst formulations, Pt—Ru alloys have shown the best results for the methanol electro-oxidation. Following a bi-functional mechanism, the Ru—OH species act as a source of atomic oxygen, which is required for the electro-oxidation of the adsorbed carbon monoxide to carbon dioxide, thus liberating active sites on the surface of the catalyst material near a Pt atom. The reaction steps are described using a bi-functional mechanism as follows:

$$Ru+H_2O \rightarrow Ru-OH_{ads}+H^++e^- \quad (4)$$

$$Pt-CO_{ads}+Ru-OH_{ads} \rightarrow Pt+Ru+CO_2+H^++e^- \quad (5)$$

However, the use of the noble metals, such as Pt and Ru, contributes to the high cost of the methanol electro-oxidation catalysts, which affects the overall cost of the direct methanol fuel cell. Thus, development of active methanol electro-oxidation catalysts with lower amounts of Pt and preferably without using Ru at all is desired.

Thus, a methanol electro-oxidation catalyst and method of making the same solving the aforementioned problems is desired.

SUMMARY OF THE INVENTION

The present invention relates to methanol electro-oxidation catalysts and a method for preparing active methanol electro-oxidation catalysts. The methanol electro-oxidation catalysts described herein contain less platinum than is normally required for reasonable activity in conventional methanol electro-oxidation catalysts and do not contain ruthenium. The active methanol electro-oxidation catalysts include nano-oxides of rare earth metals (i.e., cesium, praseodymium, neodymium and samarium) and platinum nanoparticles. The nano-oxides of the rare earth metals are dispersed during synthesis of a support material, preferably formed from mesoporous carbon.

The catalyst includes a support material formed from mesoporous carbon, a nano-oxide of a rare earth metal dispersed in the support material, and platinum nano-particles supported on the nano-oxide of the rare earth metal so that the platinum nano-particles form between about 10 wt % and about 15 wt % of the methanol electro-oxidation catalyst, the rare earth metal forms between about 10 wt % and about 15 wt % of the methanol electro-oxidation catalyst, and carbon and oxygen form the balance (between about 70 wt % and about 80 wt %) of the methanol electro-oxidation catalyst.

In order to prepare the catalyst, SBA-15 mesoporous silica is first added to a 0.5M rare earth metal nitrate solution in ethanol to form an intermediate solution. The intermediate solution is then evaporated to obtain a dry powder. The dry powder is oxidized to form a composition of an oxide of a rare earth metal and SBA-15 mesoporous silica.

A sucrose and sulfuric acid solution is then added to the composition to form a slurry. The slurry is dried to form a secondary dry powder. The secondary dry powder is then carbonized to form a composition of an oxide of a rare earth metal and mesoporous carbon. $NaBH_4$ reduction is then performed on the composition of an oxide of a rare earth metal, and mesoporous carbon and a platinum precursor is added to form a secondary slurry. The secondary slurry is dried to form the methanol electro-oxidation catalyst.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present active methanol electro-oxidation catalysts include nano-oxides of rare earth metals (i.e., cesium, praseodymium, neodymium and samarium) and platinum nanoparticles. The nano-oxides of the rare earth metals are dispersed during synthesis of a support material, preferably formed from mesoporous carbon. The platinum nano-particles form between about 10 wt % and about 15 wt % of the methanol electro-oxidation catalyst, the rare earth metal forms between about 10 wt % and about 15 wt % of the methanol electro-oxidation catalyst, and carbon and oxygen form the balance (between about 70 wt % and about 80 wt %) of the methanol electro-oxidation catalyst.

SBA-15 mesoporous silica is used as a template for preparing the mesoporous carbon (MC) incorporated with the nano-oxides of the rare earth metals, although it should be understood that other suitable materials may be substituted as the template. Initially, SBA-15 was synthesized by dispersing 4 g of poly (ethylene glycol)—block-poly (propylene glycol)—block poly (ethylene glycol) (EO$_{20}$PO$_{70}$EO$_{20}$), a tri-block copolymer sold under the trade name Pluronic P-123, manufactured by BASF SE, into 30 g of distilled water, and stirred for 4 hours at room temperature. The Pluronic P-123 serves as a structure-directing agent. Then, 120 mL of 2M hydrochloric acid (HCl) solution was added and stirred at 40° C. for 2 hours. This was followed by the addition of 9 g of tetraethylorthosilicate and continuous stirring for 24 hours at 40° C. The resulting gel was aged at 130° C., after which it was filtered, washed with deionized water several times, and dried in an oven at 100° C. overnight. Finally, the powder was calcined at 540° C. for 24 hours to obtain the SBA-15.

For the preparation of CeO$_2$-SBA-15, PrO$_2$-SBA-15, NdO$_2$-SBA-15 and SmO$_2$-SBA-15, a required amount of the prepared SBA-15 in ethanol was added to 0.5M of cerium (III) nitrate hexahydrate solution in ethanol, 0.5M praseodymium (III) nitrate n-hydrate solution in ethanol, 0.5M neodymium (III) nitrate hexahydrate solution in ethanol and 0.5M samarium (III) nitrate hexahydrate solution in ethanol, respectively. The solutions were stirred for 24 hours at room temperature and then evaporated to obtain dry powders. This was then followed by oxidation at 300° C. for 3 hours under an oxygen atmosphere to obtain the CeO$_2$-SBA-15, PrO$_2$-SBA-15, NdO$_2$-SBA-15 and SmO$_2$-SBA-15.

Figure 1:
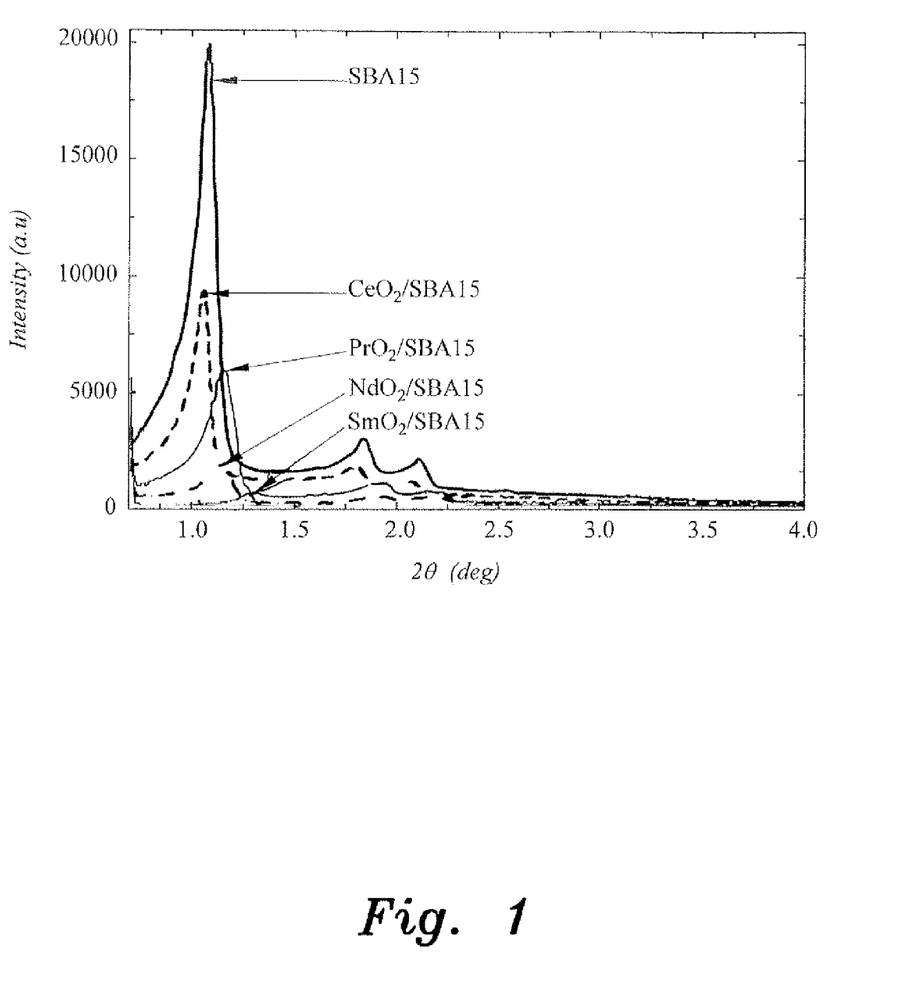
FIG. 1 is a graph showing low angle x-ray diffraction (XRD) intensity as a function of angle for SBA-15, $CeO_2$-SBA-15, $PrO_2$-SBA-15, $NdO_2$-SBA-15 and $SmO_2$-SBA-15 samples prepared by the method of making methanol electro-oxidation catalysts according to the present invention.

As shown in FIG. 1, low angle x-ray diffraction (XRD) patterns were obtained for SBA-15, CeO$_2$-SBA-15, PrO$_2$-SBA-15, NdO$_2$-SBA-15 and SmO$_2$-SBA-15 samples. The XRD patterns obtained for the CeO$_2$-SBA-15, PrO$_2$-SBA-15, NdO$_2$-SBA-15 and SmO$_2$-SBA-15 samples are similar to that of the host SBA-15 sample, which indicates that the structure of the SBA-15 is successfully maintained. The XRD patterns for all the samples show three well-resolved diffraction peaks for the 2θ angle near 1.0, 1.65, and 2.0, which are characteristics of hexagonally-arranged mesoporous materials. However, there is a slight shift towards the higher angle for the PrO$_2$-SBA-15, NdO$_2$-SBA-15, and SmO$_2$-SBA-15 samples, unlike the CeO$_2$-SBA-15 sample. Thus, a better alloying is observed for the CeO$_2$-SBA-15 sample.

Figure 2A:
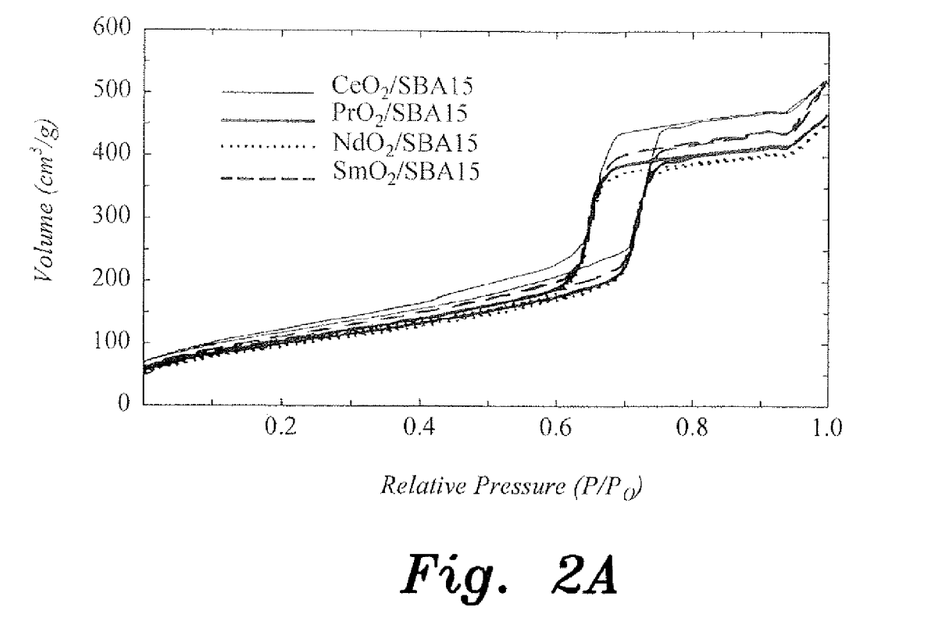
FIG. 2A is a graph showing the specific surface area of the $CeO_2$-SBA-15, $PrO_2$-SBA-15, $NdO_2$-SBA-15 and $SmO_2$-SBA-15 samples of FIG. 1.
Figure 2B:
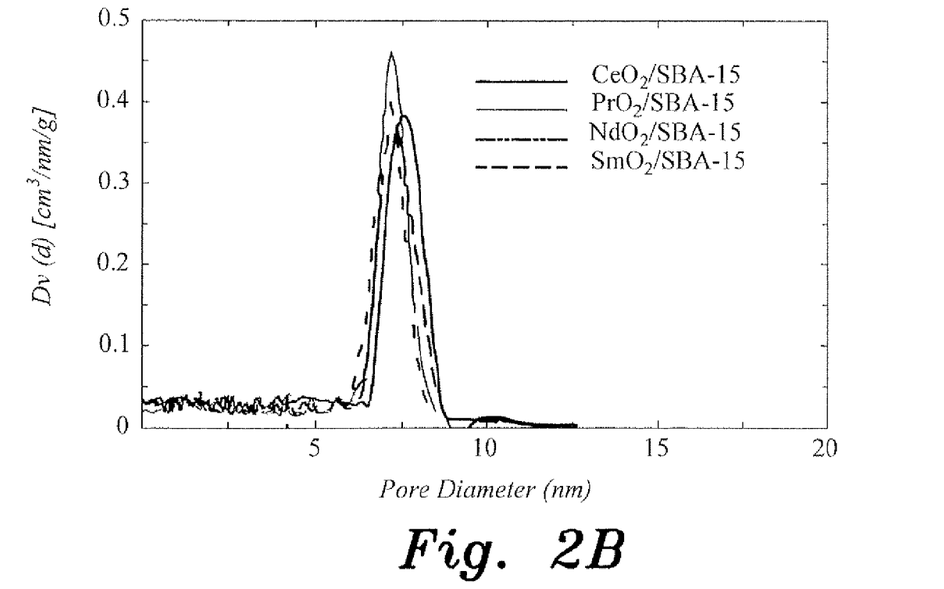
FIG. 2B is a graph showing the porosity of the $CeO_2$-SBA-15, $PrO_2$-SBA-15, $NdO_2$-SBA-15 and $SmO_2$-SBA-15 samples of FIG. 1.

The specific surface area and porosity of the CeO$_2$-SBA-15, PrO$_2$-SBA-15, NdO$_2$-SBA-15 and SmO$_2$-SBA-15 samples were measured by N$_2$ physisorption and the results are shown in FIGS. 2A and 2B, respectively, and Table 1 below. In FIG. 2A, all of the isotherms for the samples show a typical Type 1V model (according to the IUPAC classification) and have a H1 hysteresis loop at the high pressure side that is representative of mesopores. The type 1V adsorption isotherm characterizes the existence of mesoporosity in the CeO$_2$-SBA-15, PrO$_2$-SBA-15, NdO$_2$-SBA-15 and SmO$_2$-SBA-15 samples. The shape of the N$_2$ adsorption-desorption isotherms further confirms that a well-ordered mesoporous structure similar to that of the host SBA-15 was obtained for all of the samples.

The sharp inflections between the relative pressures (P/P$_0$) 0.6-0.8 in the isotherms correspond to capillary condensation within the uniform mesopores. The sharpness of the inflection step demonstrates the extent of uniform pore size distribution in the CeO$_2$-SBA-15, PrO$_2$-SBA-15, NdO$_2$-SBA-15 and SmO$_2$-SBA-15 samples. The textural parameters, such as the specific surface area, pore volume and pore diameters, are given in Table 1 below. Pore size distribution derived from desorption branch of the N$_2$ hysteresis for the samples is shown in FIG. 2B. The BJH method was used to analyze the desorption branch of the isotherms at relatively high pressure to obtain the pore size distribution of the CeO$_2$-SBA-15, PrO$_2$-SBA-15, NdO$_2$-SBA-15 and SmO$_2$-SBA-15 samples.

TABLE 1

Pore Structure Properties of Rare Earth Metal Nano-Oxides in SBA-15

| Sample | BET Surface Area (m$^2$/g) | Total Pore Volume (cm$^3$/g) | Average Pore Diameter (nm) |
|---|---|---|---|
| CeO$_2$-SBA-15 | 571 | 0.91 | 5.6 |
| PrO$_2$-SBA-15 | 504 | 0.71 | 5.7 |
| NdO$_2$-SBA-15 | 490 | 0.69 | 5.8 |
| SmO$_2$-SBA-15 | 526 | 0.75 | 5.7 |

For the preparation of CeO$_2$-MC, PrO$_2$-MC, NdO$_2$-MC, and SmO$_2$-MC, 1.25 g of sucrose, 5 g of water and 0.14 g of H$_2$SO$_4$ were mixed together to obtain a solution, which was added drop-wise to 1 g of CeO$_2$-SBA-15, PrO$_2$-SBA-15, NdO$_2$-SBA-15 and SmO$_2$-SBA-15 each. The slurries were dried at 160° C. in an oven and then crushed to obtain fine dry powders. The obtained dried powders were dissolved in a mixture of 0.83 g of sucrose, 5 g of water and 0.093 g of sulfuric acid. The slurries were again dried at 160° C. in an oven and then crushed to obtain fine dry powders. The dried powders were then carbonized at 900° C., treated with hydrofluoric acid solution, filtered, and washed three times with ethanol. The samples were then dried at 160° C. in an oven for 8 hours to obtain the $CeO_2$-MC, $PrO_2$-MC, $NdO_2$-MC, and $SmO_2$-MC samples.

Figure 3A:
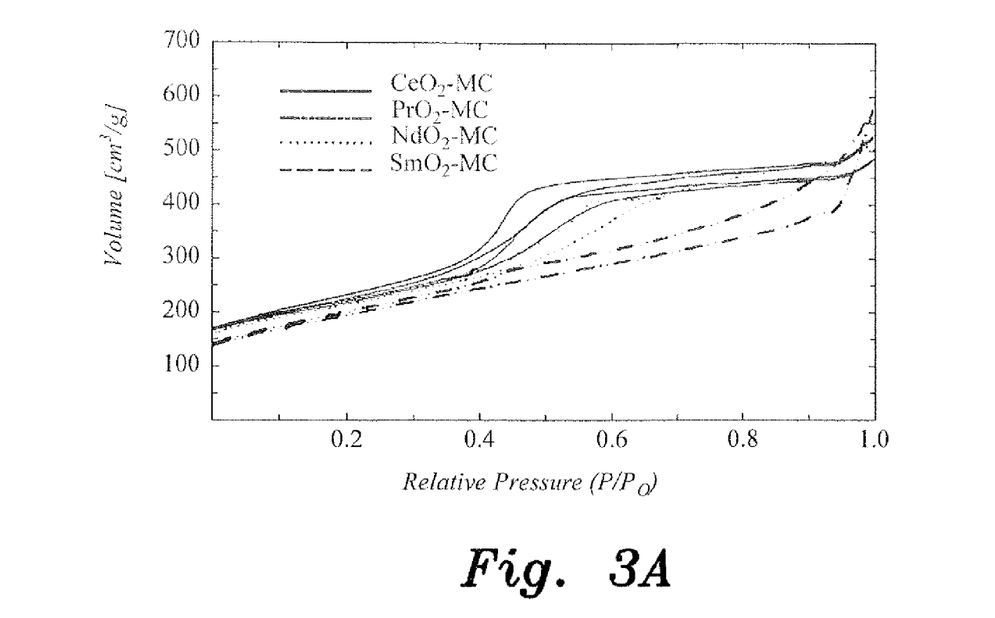
FIG. 3A is a graph showing specific surface area of $CeO_2$-MC, $PrO_2$-MC, $NdO_2$-MC and $SmO_2$-MC samples prepared by the method of making methanol electro-oxidation catalysts according to the present invention.
Figure 3B:
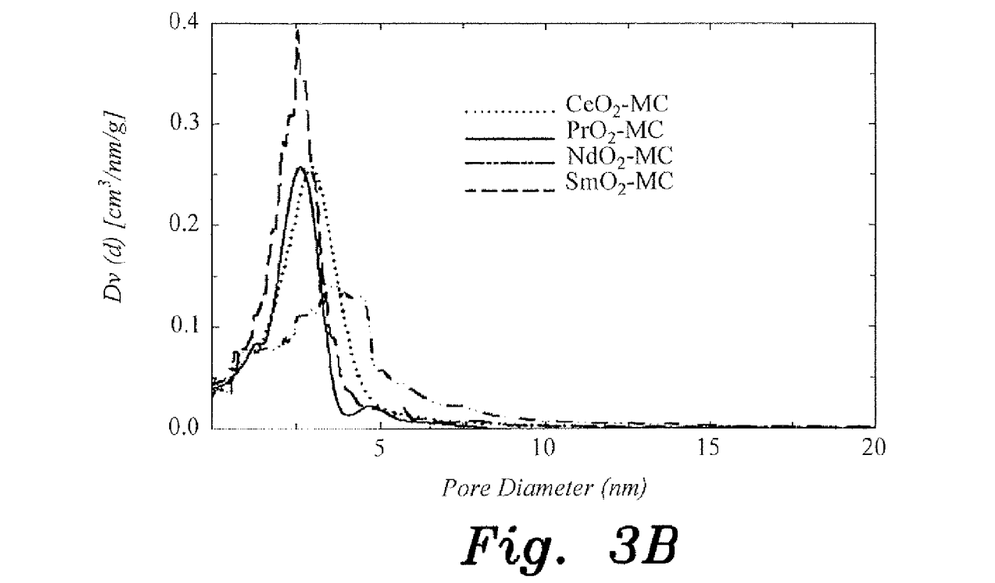
FIG. 3B is a graph showing porosity of the $CeO_2$-MC, $PrO_2$-MC, $NdO_2$-MC and $SmO_2$-MC samples of FIG. 3A.
Figure 4A:
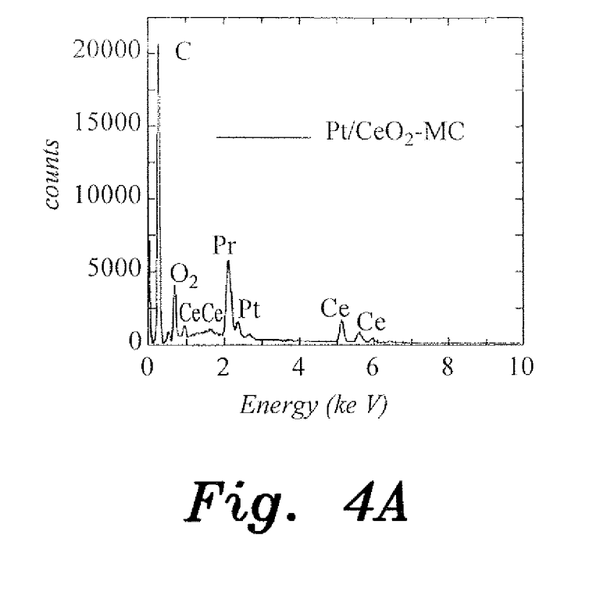
FIG. 4A is an energy dispersive spectroscopy (EDS) graph showing elemental composition of a Pt/$CeO_2$-MC sample prepared by the method of making methanol electro-oxidation catalysts according to the present invention.
Figure 4B:
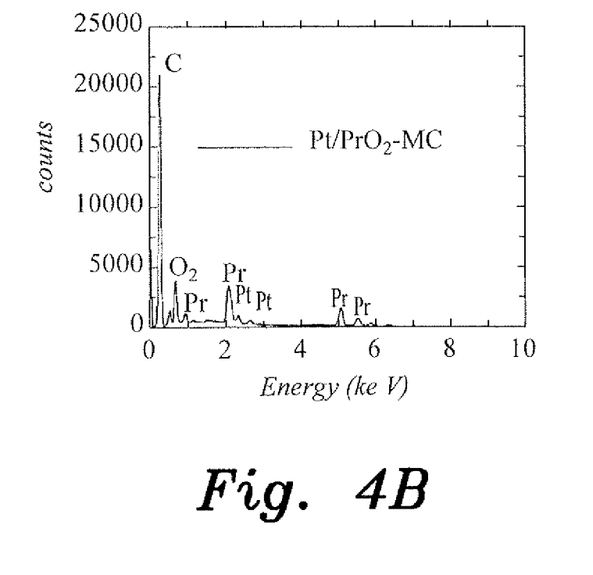
FIG. 4B is an energy dispersive spectroscopy (EDS) graph showing elemental composition of a Pt/$PrO_2$-MC sample prepared by the method of making methanol electro-oxidation catalysts according to the present invention.
Figure 4C:
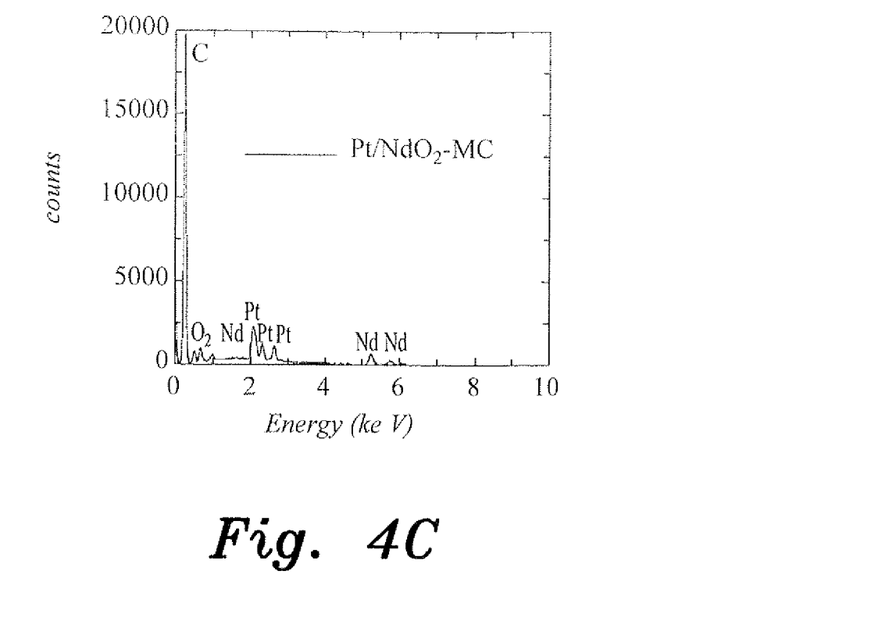
FIG. 4C is an energy dispersive spectroscopy (EDS) graph showing elemental composition of a Pt/$NdO_2$-MC sample prepared by the method of making methanol electro-oxidation catalysts according to the present invention.
Figure 4D:
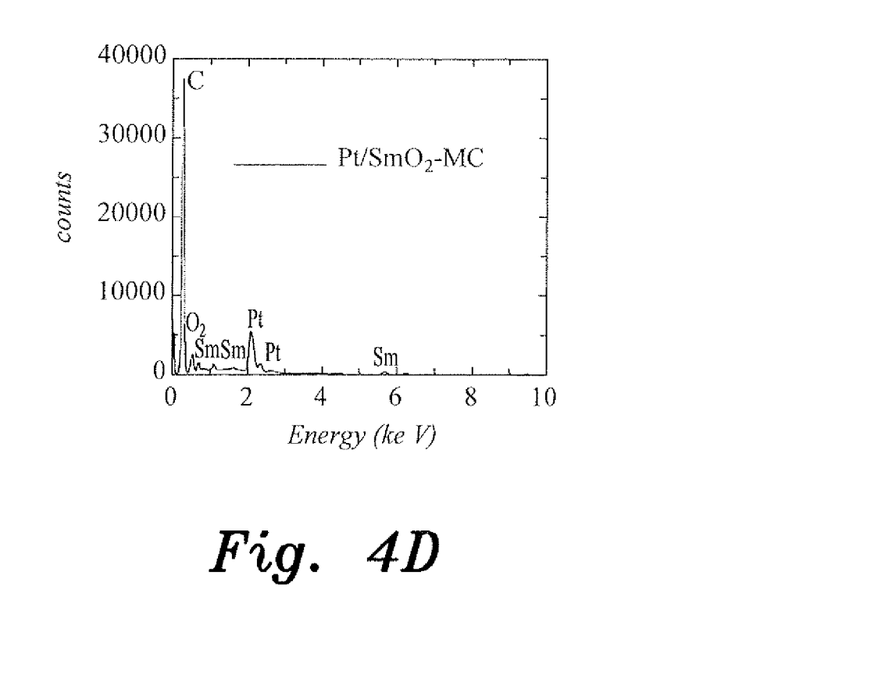
FIG. 4D is an energy dispersive spectroscopy (EDS) graph showing elemental composition of a Pt/SmO$_2$-MC sample prepared by the method of making methanol electro-oxidation catalysts according to the present invention.

The specific surface area and porosity of the $CeO_2$-MC, $PrO_2$-MC, $NdO_2$-MC, and $SmO_2$-MC samples were measured by $N_2$ physisorption and the results are shown in FIGS. 3A and 3B, respectively, and Table 2 below. In FIG. 3A, all the isotherms for the samples show a typical Type 1 V model according to the IUPAC classification. Pore size distribution derived from the desorption branch of the $N_2$ hysteresis for the samples is shown in FIG. 3B. The BJH method was used to analyze the desorption branch of the isotherms at relatively high pressure to obtain the pore size distribution of the $CeO_2$-MC, $PrO_2$-MC, $NdO_2$-MC, and $SmO_2$-MC samples. The textural parameters, such as specific surface area, pore volume and pore diameters, are given in Table 2 below. It can be observed that in all of the samples, there is a significant increase in the specific surface area and decrease in pore diameter compared to the parent samples; i.e., the $CeO_2$-SBA-15, $PrO_2$-SBA-15, $NdO_2$-SBA-15 and $SmO_2$-SBA-15 samples. The increase in specific surface area is caused by the carbonization process. The large surface area plays a key role in forming optimal catalyst samples by providing sufficient space for dispersing the Pt particles. In addition, it can be seen that mesopores are the dominant pores in all of the prepared catalyst samples, which is beneficial for the preparation of optimal methanol electro-oxidation catalysts. It is well known that molecules within microporous channels could suffer significantly hindered transport, while molecules in mesoporous channels can approach diffusion rates comparable to those in an open medium.

TABLE 2

Pore Structure Properties of Rare Earth
Metal Nano-Oxides in Mesoporous Carbon

| Sample | BET Surface Area (m²/g) | Total Pore Volume (cm³/g) | Average Pore Diameter (nm) |
|---|---|---|---|
| $CeO_2$-MC | 732 | 0.72 | 3.9 |
| $PrO_2$-MC | 684 | 0.65 | 4.0 |
| $NdO_2$-MC | 742 | 0.73 | 3.8 |
| $SmO_2$-MC | 778 | 0.75 | 3.8 |

The catalyst samples were prepared using conventional $NaBH_4$ reduction by dispersing $CeO_2$-MC, $PrO_2$-MC, $NdO_2$-MC, and $SmO_2$-MC in deionized water, followed by ultrasonication. Then, 100 mg of $NaBH_4$ in 5 mL deionized water was added immediately. This was followed by rapid addition of a Pt precursor, hydrogen hexachloroplatinate (IV) hexahydrate ($H_2PtCl_6$ $6H_2O$). The slurries were stirred for 24 hours at room temperature, filtered, washed with deionized water, and then dried in a vacuum oven at 100° C. for 6 hours to obtain the Pt/$CeO_2$-MC, Pt/$PrO_2$-MC, Pt/$NdO_2$-MC and Pt/$SmO_2$-MC catalyst samples.

Energy dispersive spectroscopy (EDS) was used to determine the elemental composition of the prepared catalyst samples, and the corresponding results are shown in FIGS. 4A-4D and Table 3 below. In FIGS. 4A-4D, it can be observed that in all the catalyst samples, Pt appear as one of the major elements, while Table 3 shows that the Pt weight percentage is in the range of 12.36-13,92 wt %. This confirms that the prepared $CeO_2$-MC, $PrO_2$-MC, $NdO_2$-MC and $SmO_2$-MC samples were successfully impregnated with Pt nanoparticles. However, 15 wt % Ce, Pr, Nd, and Sm each was also used in the preparation of the catalyst samples, but based on the EDS results shown in Table 3, it can be observed that the Ce, Pr, Nd, and Sm ranges between 10.29-12.37 wt %. This is not unexpected because EDS gives bulk percentages and the difference is within an acceptable range.

TABLE 3

Elemental Composition of Catalyst Samples from EDS Results

| Catalyst | Element | Weight % | Atomic % |
|---|---|---|---|
| Pt/$CeCO_2$-MC | Pt | 13.92 | 2.10 |
| | Ce | 11.05 | 1.85 |
| | $O_2$ | 8.76 | 8.80 |
| | C | 66.27 | 88.25 |
| Pt/$PrO_2$-MC | Pt | 13.85 | 1.23 |
| | Pr | 12.37 | 2.10 |
| | $O_2$ | 7.42 | 8.04 |
| | C | 66.36 | 88.63 |
| Pt/$NdO_2$-MC | Pt | 12.94 | 1.16 |
| | Nd | 10.29 | 3.91 |
| | $O_2$ | 6.20 | 6.15 |
| | C | 70.57 | 88.78 |
| Pt/$SmO_2$-MC | Pt | 12.36 | 0.99 |
| | Sm | 10.63 | 1.15 |
| | $O_2$ | 6.51 | 6.34 |
| | C | 70.50 | 91.52 |

Figure 5:
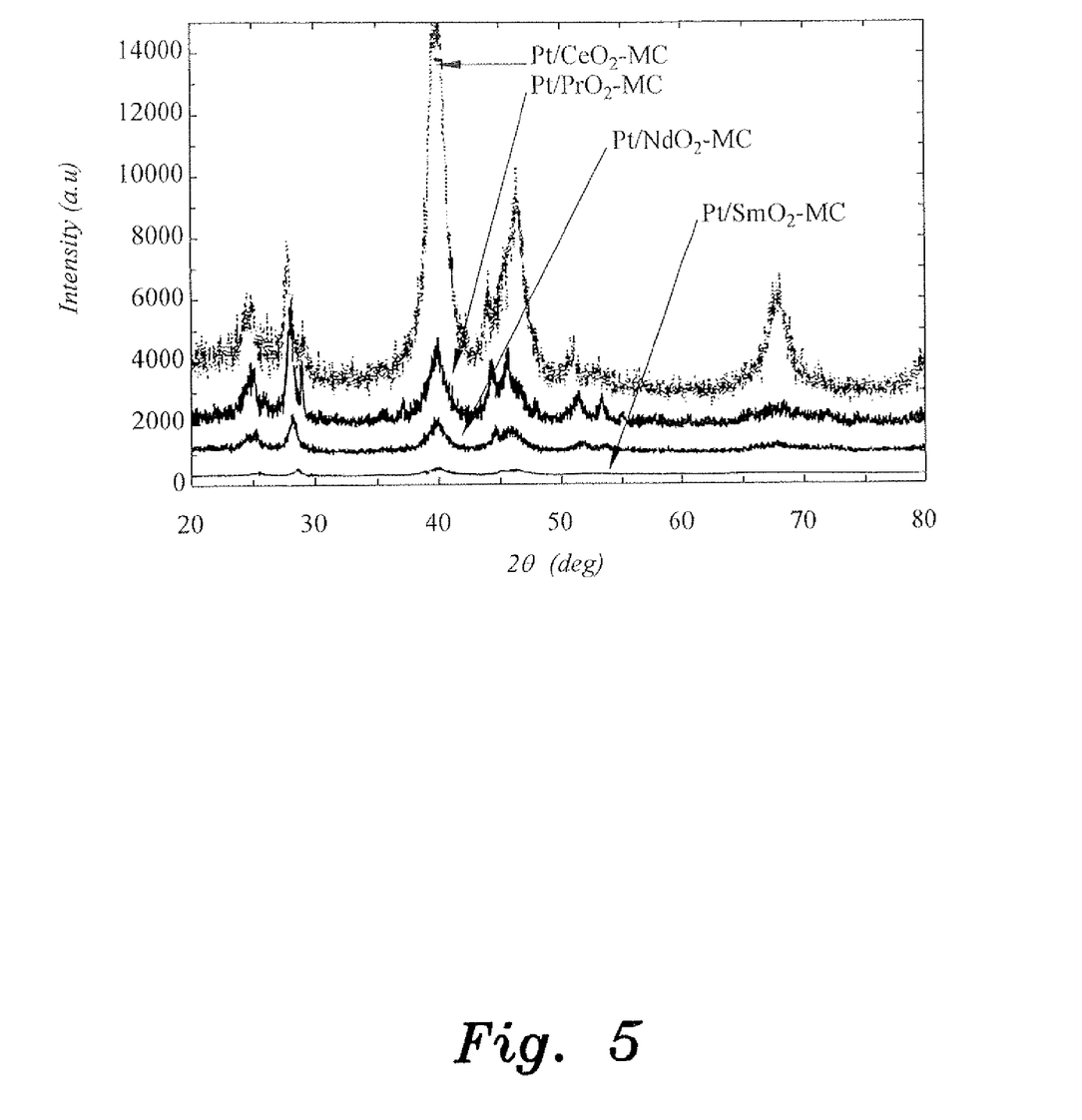
FIG. 5 is a graph showing high angle x-ray diffraction intensity as a function of angle for the Pt/CeO$_2$-MC, Pt/PrO$_2$-MC, Pt/NdO$_2$-MC and Pt/SmO$_2$-MC samples prepared by the method of making methanol electro-oxidation catalysts according to the present invention.

FIG. 5 shows the high angle powder XRD patterns obtained for the prepared catalyst samples. In all of the samples, the presence of the face-centered cubic (fcc) structure typical of platinum metal can be inferred from the strong diffractions represented by the crystalline planes (111), (200), and (220), near 2θ of 40.0°, 46.0°, and 68.5°, respectively. The Pt crystal size was calculated using the Debye-Scherrer's equation. In order to determine the Pt crystal size, the (220) reflection was used because, even though it is not the strongest, it is completely outside the region of the broad band produced by the carbon support, thus there is no overlap. The Pt crystal size and lattice parameter for the prepared catalyst samples are given in Table 4 below. From Table 4, it can be seen that Pt/$SmO_2$-MC catalyst sample shows the least Pt crystal size of 1.3 nm and the highest lattice parameter of 3.8911 Å.

TABLE 4

XRD Data Analysis Results for Catalyst Samples

| Catalyst Sample | Crystal Size (nm) | $d_{hkl}$ (Å) | Lattice Parameter (Å) |
|---|---|---|---|
| Pt/$CeO_2$-MC | 1.4 | 1.3686 | 3.8710 |
| Pt/$PrO_2$-MC | 1.4 | 1.3669 | 3.8662 |
| Pt/$NdO_2$-MC | 1.4 | 1.3722 | 3.8812 |
| Pt/$SmO_2$-MC | 1.3 | 1.3757 | 3.8911 |

Figure 6:
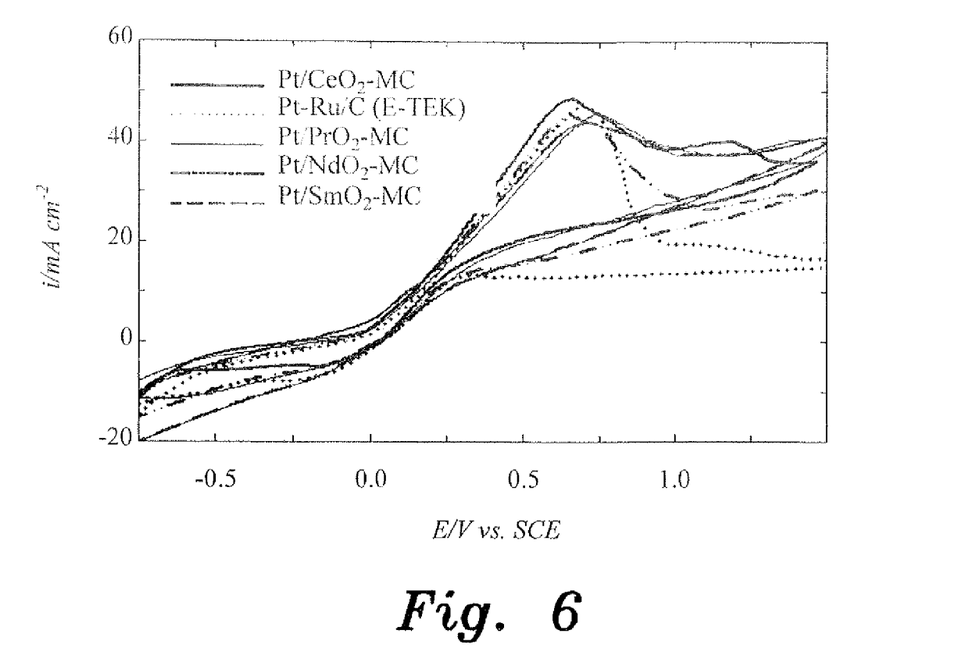
FIG. 6 is a graph showing cyclic voltammetry curves for the methanol electro-oxidation activities of the Pt/CeO$_2$-MC, Pt/PrO$_2$-MC, Pt/NdO$_2$-MC and Pt/SmO$_2$-MC samples compared with a conventional commercial Pt-Ru/C catalyst sample.

The activity of the prepared catalyst samples for methanol electro-oxidation was measured using a beaker-type electrochemical cell. As shown in FIG. 6, cyclic voltammetry curves were obtained for the methanol electro-oxidation activity for the prepared catalyst samples and commercial Pt—Ru/C measured in $N_2$ purged 1M $H_2SO_4$+2M $CH_3OH$ solution. The anodic peaks for methanol electro-oxidation are clearly observed for all the catalyst samples between 0.62-0.69 V. In addition, similar onset potential is observed for all the catalyst samples. As shown in Table 5 below, the Pt/$CeO_2$-MC catalyst sample showed the highest activity for methanol electro-oxidation, which is about 3.5% more than that of the commercial Pt—Ru/C. However, the other prepared catalyst samples showed a slightly lower activity compared to the commercial Pt—Ru/C.

The reason for the high activity of the Pt/CeO$_2$-MC catalyst sample is due to better synergic interaction between CeO$_2$ and the support, which is confirmed from the low angle XRD pattern (shown in FIG. 1). In addition, from the EDS results, the highest amount of Pt, which is 13.92 wt %, was found in the Pt/CeO$_2$-MC catalyst sample. This means that it has accommodated more Pt because of better synergy and the greater amount of platinum translates to better catalyst activity. Furthermore, the Pt/CeO$_2$-MC catalyst sample shows a moderate Pt crystal size of 1.4 nm and a lattice parameter of 3.8710 Å, which may lead to good dispersion. This is unlike the Pt/SmO$_2$-MC catalyst sample, which shows the least catalytic activity, which can be attributed to its lowest Pt crystal size of 1.3 nm and the highest lattice parameter of 3.8911 Å, resulting in scattering of the Pt particles rather than good dispersion.

TABLE 5

Cyclic Voltammetry Results for Catalyst Samples and E-TEK

| Catalyst Sample | Peak Position V vs. SCE | Current Density (mA/cm$^{-2}$) | Mass Activity (mA/mg) |
|---|---|---|---|
| Pt/CeO$_2$-MC | 0.62 | 47 | 10.56 |
| Pt/PrO$_2$-MC | 0.69 | 43 | 9.66 |
| Pt/NdO$_2$-MC | 0.62 | 42 | 9.44 |
| Pt/SmO$_2$-MC | 0.66 | 41 | 9.21 |
| Pt-Ru/C (E-TEK) | 0.66 | 45 | 10.11 |

Figure 7:
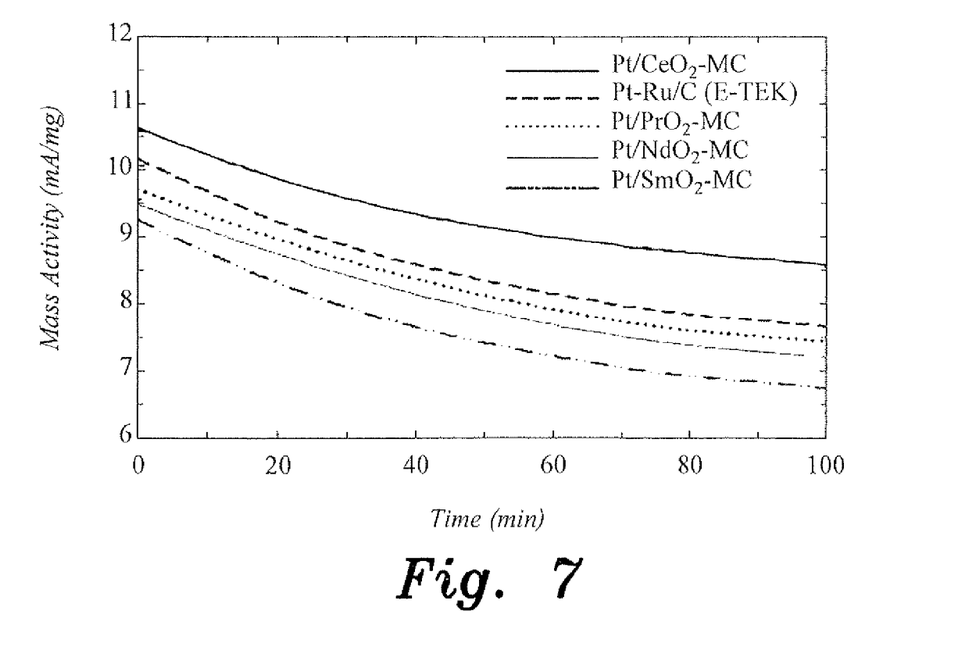
FIG. 7 is a graph showing mass activities as a function of time for the Pt/CeO$_2$-MC, Pt/PrO$_2$-MC, Pt/NdO$_2$-MC and Pt/SmO$_2$-MC samples compared with a conventional commercial. Pt-Ru/C catalyst sample.

A preliminary stability test was conducted for all of the catalyst samples, as shown in FIG. 7. The catalysts' mass activity decreased by 19.1%, 23.2%, 23,8%, 24.4% and 26.8%, respectively, from its initial value for the Pt/CeO$_2$-MC Pt/PrO$_2$-MC, Pt/NdO$_2$-MC, commercial Pt-Ru/C and Pt/SmO$_2$-MC. In general, a gradual decay in mass activity with time was observed for all of the catalyst samples. This is an indication of good tolerance or removal of adsorbed carbon monoxide and other intermediate compounds that normally poison the catalyst.

The methanol electro-oxidation catalysts described herein do not contain Ru and have lower Pt contents than in conventional catalysts. Additionally, the present catalysts show good activity and reasonable stability, thus allowing them to be used as catalysts for methanol electro-oxidation for direct methanol fuel cell applications and the like. The low weight percentage of platinum and lack of ruthenium reduces the cost of the catalysts, which, in turn, reduces the overall cost of the direct methanol fuel cell. Unlike conventional catalysts, Ru was not used and the Pt content in the prepared catalyst samples is 15 wt % only, which is low compared to the 30-40 wt % metals (Pt and Ru) content normally used in the commercial catalysts.

It is to be understood that the present invention is not limited to the embodiments described above, but encompasses any and all embodiments within the scope of the following claims.

We claim:

1. A method of making a methanol electro-oxidation catalyst, comprising the steps of:
    adding SBA-15 mesoporous silica to a 0.5M rare earth metal nitrate solution in ethanol to form an intermediate solution;
    evaporating the intermediate solution to obtain a dry powder;
    oxidizing the dry powder to form a composition of an oxide of a rare earth metal and SBA-15 mesoporous silica adding a sucrose and sulfuric acid solution to the composition to form a slurry;
    drying the slurry to form a secondary dry powder;
    carbonizing the secondary dry powder to form a composition of an oxide of a rare earth metal and mesoporous carbon;
    performing NaBH$_4$ reduction on the composition of an oxide of a rare earth metal and mesoporous carbon;
    adding a platinum precursor to form a secondary slurry; and
    drying the secondary slurry to form the methanol electro-oxidation catalyst.

2. The method of making a methanol electro-oxidation catalyst as recited in claim 1, wherein the step of adding the SBA-15 mesoporous silica to the 0.5M rare earth metal nitrate solution in ethanol comprises adding the SBA-15 mesoporous silica to a solution selected from the group consisting of: 0.5M cerium (III) nitrate hexahydrate solution in ethanol, 0.5M praseodymium (III) nitrate n-hydrate solution in ethanol, 0.5M neodymium (III) nitrate hexahydrate solution in ethanol, and 0.5M samarium (III) nitrate hexahydrate solution in ethanol.

3. The method of making a methanol electro-oxidation catalyst as recited in claim 2, further comprising the step of stirring the intermediate solution for about 24 hours at room temperature prior to the evaporation thereof.

4. The method of making a methanol electro-oxidation catalyst as recited in claim 3, wherein the step of oxidizing the dry powder comprises heating the dry powder at about 300° C. for about 3 hours under an oxygen atmosphere.

5. The method of making a methanol electro-oxidation catalyst as recited in claim 4, wherein the step of adding the sucrose and sulfuric acid solution to the composition to form the slurry comprises adding about 1.25 g of sucrose, about 5.0 g of water and about 0.14 g of sulfuric acid to about 1.0 g of the composition.

6. The method of making a methanol electro-oxidation catalyst as recited in claim 5, wherein the step of drying the slurry to form a secondary dry powder comprises drying the slurry in an oven at a temperature of about 160° C. and crushing the dried slurry to produce the secondary dried powder.

7. The method of making a methanol electro-oxidation catalyst as recited in claim 6, further comprising the steps of:
    adding about 0.83 g of sucrose, about 5.0 g of water and about 0.093 g of sulfuric acid to the secondary dried powder to form a tertiary slurry; and
    drying the tertiary slurry in an oven at a temperature of 160° C. and crushing the tertiary dried slurry.

8. The method of making a methanol electro-oxidation catalyst as recited in claim 7, wherein the step of carbonizing the secondary dry powder to form the composition of an oxide of a rare earth metal and mesoporous carbon comprises carbonizing at about 900° C.

9. The method of making a methanol electro-oxidation catalyst as recited in claim 8, further comprising the steps of:
    treating the carbonized secondary dried powder with hydrofluoric acid solution;
    filtering the treated carbonized secondary dried powder;
    washing the filtered and treated carbonized secondary dried powder with ethanol; and
    drying the washed carbonized secondary dried powder.

10. The method of making a methanol electro-oxidation catalyst as recited in claim 9, wherein the step of adding the platinum precursor to form the secondary slurry comprises adding hydrogen hexachloroplatinate (IV) hexahydrate.

11. The method of making a methanol electro-oxidation catalyst as recited in claim 10, further comprising the steps of:
   stirring the secondary slurry for about 24 hours at room temperature;
   filtering the secondary slurry; and
   washing the secondary slurry with deionized water.

12. The method of making a methanol electro-oxidation catalyst as recited in claim 11, wherein the step of drying the secondary slurry comprises drying the secondary slurry in a vacuum oven at about 100° C. for about 6 hours.

* * * * *